United States Patent Office 2,922,777
Patented Jan. 26, 1960

2,922,777

THERMOPLASTIC COMPOSITIONS HAVING IMPROVED STABILITY TO HEAT AND LIGHT

Billy E. Burgert and David A. Gordon, Midland, Mich., assignors to The Dow Chemical Company, Midland, Mich., a corporation of Delaware No Drawing. Application August 2, 1956
Serial No. 601,636

6 Claims. (Cl. 260—45.8)

This invention relates to new and improved thermoplastic compositions based on haloethylene polymers. More particularly it relates to such compositions having improved stability to the degradative effects of heat and light.

Thermoplastic compositions, particularly those based on haloethylene polymers, have found wide acceptance as useful materials for making films, foils, fibers, filaments, and other articles. The articles so produced are inherently strong, dimensionally stable, relatively inert to common household solvents, and are easily colored for an attractive appearance. However, such compositions and the articles produced therefrom are subject to rapid and severe degradation and discoloration when exposed to elevated temperatures, such as those encountered in conventional thermal fabrication techniques, and to light, particularly ultraviolet light. The problem becomes most serious when such polymeric compositions are thermally fabricated into filamentary materials which are employed in window curtains, automobile seat covers, and similar articles which are exposed for prolonged periods to relatively high temperatures and to direct sunlight. To overcome that instability it has become commonplace to incorporate certain additives into the composition as heat stabilizers and other additives as light stabilizers. Consequently it has been necessary to search for light stabilizing material and for heat stabilizing materials each of which satisfies the many known requirements and desirable characteristics of such stabilizers. As an additional requirement, however, it has been mandatory that each of the materials be inert toward the other so as not to destroy the stabilizing effectiveness of either. All of the prior known combinations of heat stabilizers and light stabilizers have failed for one or more of the reasons of toxicity, volatility, solubility, color, taste, odor, or other reason. Also the use of two stabilizers requires a double inventory of materials, and an added procedural step in blending.

It is accordingly the principal object to provide new and improved thermoplastic compositions having improved stability to the degradative effects of heat and light.

It is a further object to provide such compositions based on haloethylene polymers.

It is a still further object to provide such compositions wherein a single compound provides the heat and light stability.

The above and related objects are achieved with a polymeric composition comprising a thermoplastic material together with stabilizing quantities of a 2,3,-epoxypropoxy benzophenone derivative falling within the scope of the general formula:

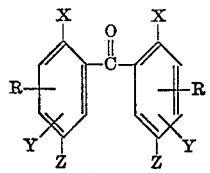

wherein at least one R is 2,3-epoxypropoxy and the remaining R is selected from the group consisting of hydrogen and 2,3-epoxypropoxy, X is selected from the group consisting of hydrogen and hydroxyl with at least one X being hydroxyl, Y is selected from the group consisting of hydrogen and hydroxyl, and Z is selected from the group consisting of hydrogen and benzoyl. The compositions of this invention show effective resistance to the degradative and discoloring effects of heat and light even after prolonged exposure.

Among the specific compounds defined by the foregoing formula and which have the desired stabilizing effectiveness are:

4-(2,3-epoxypropoxy)-2-hydroxybenzophenone
4'-(2,3-epoxypropoxy)-2-hydroxybenzophenone
4-(2,3-epoxypropoxy)-2,2'-dihydroxybenzophenone
4,4'-bis(2,3-epoxypropoxy)-2hydroxybenzophenone
4,4'-bis(2,3-epoxypropoxy)-2,2'-dihydroxybenzophenone
3 - (2,3 - epoxypropoxy)-5-benzoyl-2,4-dihydroxybenzophenone
4 - (2,3 - epoxypropoxy)-3-benzoyl-2,6-dihydroxybenzophenone
4 - (2,3 - epoxypropoxy)-3'-[4-(2,3-epoxypropoxy)-2-hydroxybenzoyl]-2-hydroxybenzophenone Any polymeric material normally subject to degradation and discoloration due to exposure to heat and light may be used in these compositions. However, especially advantageous results are obtained when haloethylene polymers such as polyvinylchloride, copolymers of vinyl chloride and vinylidene chloride, and copolymers of vinylidene chloride with other copolymerizable monomers in which the vinylidene chloride is present in an amount of at least 50 percent of the copolymer, are employed. Such haloethylene polymers are preferred in preparing the compositions since those polymers are particularly sensitive to heat and light.

The stabilizing agents of this invention are easily prepared from readily available materials using standard laboratory procedures. In a typical preparation a solution of one equivalent of 2,4-dihydroxy benzophenone in one equivalent of sodium hydroxide was added during one hour to one equivalent of epichlorohydrin heated to 80 to 90° C. The mixture was then heated at 90° C. for two more hours resulting in a light yellow liquid separating out of aqueous solution. The yellow liquid was taken up in ether and cooled giving a light yellow solid. After recrystallization from ethanol and treatment with activated charcoal the 4-(2,3-epoxypropoxy)-2-hydroxybenzophenone was isolated as light yellow crystals melting at 99 to 100° C. The structure was confirmed by infra-red and epoxide analysis. The corresponding 4'-(2,3-epoxypropoxy)-2-hydroxybenzophenone was in the form of light yellow crystals melting at 69 to 70° C.

The benzophenone derivatives are employed in the compositions in amounts of from 1 to 10 percent of the weight of the polymer, preferably from 2 to 6 percent by weight. Less than 1 percent imparts insufficient stability to the compositions, while more than 10 percent results in no additional benefits. Most polymeric compositions comprise many ingredients such as plasticizers, fillers and pigments and the derivatives of this invention may be employed in the compositions in conjunction with such additives without any adverse effects. Likewise, the derivatives of this invention may be used in combination with other known heat and light stabilizers.

The ingredients of the composition may be intermixed by milling or by blending by known conventional methods.

By way of example several compositions were prepared from 90.5 parts by weight of a copolymer prepared from 85 percent by weight vinylidene chloride and 15 percent by weight of vinyl chloride, 5 parts by weight of ethyl phthalyl ethyl glycollate as a plasticizer, and 1.5 parts of tertiary-butyl phenyl salicylate. One of the compositions was left as a blank, one composition contained 1 part of an epoxidized glyceride stabilizer sold commercially as Paraplex G–60 by the Rohm and Haas Co., one contained 3 parts of 1-(o-biphenylyloxy)-2,3-epoxypropane for comparative purposes, and the other composition contained a stabilizer of this invention. The heat stability of the compositions was determined by a standard test in which at least 20 grams of the composition are subjected to a temperature of 178° C. and the pressure of the evolved hydrohalide gas used to determine the degree of thermal degradation. The results are relative to a standard and are reported as "T" values which are the times required for the samples to reach an arbitrary rate of pressure rise. Thus a more thermally stable composition will show a higher "T" value than a less stable composition.

Other samples of the same compositions were used to determine the light stability in an accelerated indoor test using ultra-violet sunlamps and in an outdoor exposure test wherein the samples were exposed to direct sunlight in the State of Arizona for 750 ultra-violet sun hours. Prior to exposure the compositions were compression molded into test strips having a thickness of 0.01 inch. Periodically the test strips were examined visually and the amount of discoloration noted. The results are reported in Table I.

*Table I*

| Stabilizer | Parts Stabilizer | "T" Value | Sunlamp Exposure (days) | | | Arizona Exposure (ultraviolet sun, hours) | | |
|---|---|---|---|---|---|---|---|---|
| | | | 1 | 14 | 28 | 250 | 500 | 750 |
| For comparison: None | | 5 | Light tan | Brown | Dark brown | Light tan | Light brown | Brown |
| Epoxidized glyceride | 1 | 9 | ----do---- | ----do---- | ----do---- | Tan | Brown | Do. |
| 1-(o-biphenylyloxy)-2,3-epoxypropane | 3 | 13 | Light brown | Dark brown | ----do---- | Light tan | Light brown | Do. |
| This invention: 4-(2,3-epoxypropoxy)-2-hydroxy benzophenone | 3 | 14 | No change | Light tan | Light tan | No change | No change | No change |

The results show that the composition of this invention is more resistant to both heat and light than other compositions based on known stabilizers.

Similar results are obtained when other compositions, which are based on copolymers of vinylidene chloride with other copolymerizable monomers, such as acrylonitrile and vinyl acetate, in which the vinylidene chloride is present in an amount of at least 50 percent by weight, or on polyvinylchloride, or which employ the other defined stabilizers such as 4'-(2,3-epoxypropoxy)-2-hydroxybenzophenone, are tested.

We claim:
1. A light and heat stable thermoplastic composition comprising a thermoplastic haloethylene polymer and from 1 to 10 percent by weight based on the weight of said polymer of a 2,3-epoxypropoxy benzophenone derivative having the general formula:

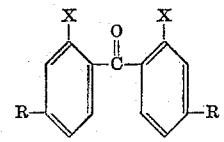

wherein at least one R is 2,3-epoxypropoxy and the remaining R is selected from the group consisting of hydrogen and 2,3-epoxypropoxy; and wherein X is selected from the group consisting of hydrogen and hydroxyl with at least one X being hydroxyl.

2. The composition claimed in claim 1, wherein said 2,3-epoxypropoxy benzophenone derivative is 4-(2,3-epoxypropoxy)-2-hydroxybenzophenone.

3. The composition claimed in claim 1, wherein said 2,3-epoxypropoxy benzophenone derivative is 4'-(2,3-epoxypropoxy)-2-hydroxybenzophenone.

4. The composition claimed in claim 1, wherein said haloethylene polymer is a copolymer containing at least 50 percent by weight of vinylidene chloride with any remainder being of a copolymerizable monomer.

5. The composition claimed in claim 1, wherein said haloethylene polymer is a copolymer of vinylidene chloride and vinyl chloride.

6. The composition claimed in claim 1, wherein said haloethylene polymer is polyvinylchloride.

References Cited in the file of this patent

UNITED STATES PATENTS

| | | |
|---|---|---|
| 2,264,291 | Boyer | Dec. 2, 1941 |
| 2,371,500 | Britton | Mar. 13, 1945 |
| 2,530,353 | Havens | Nov. 14, 1950 |